United States Patent [19]

Moreau

[11] Patent Number: 5,018,043
[45] Date of Patent: May 21, 1991

[54] REMOVABLE MODULAR CONTROL DEVICE FOR A CONTACTOR APPARATUS

[75] Inventor: Dominique Moreau, Saint Germain en Laye, France

[73] Assignee: Telemecanique, France

[21] Appl. No.: 354,665

[22] Filed: May 22, 1989

[30] Foreign Application Priority Data

May 20, 1988 [FR] France ................... 88 06765

[51] Int. Cl.$^5$ ........................................... H01H 47/00
[52] U.S. Cl. ..................................... 361/187; 361/189;
361/396
[58] Field of Search ............... 361/187, 189, 391, 396,
361/393, 394; 335/132

[56] References Cited

U.S. PATENT DOCUMENTS

| | | | |
|---|---|---|---|
| 3,588,616 | 6/1971 | Palazinni | 361/393 |
| 3,727,157 | 4/1973 | Gronert et al. | 335/132 |
| 3,980,978 | 9/1976 | Lacan | 335/132 |
| 4,137,559 | 1/1979 | Reuting | 335/132 |
| 4,356,368 | 10/1982 | Osika | 335/132 |
| 4,616,177 | 10/1986 | McClain et al. | 361/394 |
| 4,622,444 | 11/1986 | Kandatsu et al. | 335/132 |
| 4,879,437 | 11/1989 | Dard et al. | 335/132 |
| 4,926,149 | 5/1990 | Saens et al. | 335/132 |

FOREIGN PATENT DOCUMENTS 1188372  4/1970  United Kingdom ............... 361/394

OTHER PUBLICATIONS

"Molded Stackable Surface Mounted Connector", disclosed anonymously, Reproduced from Research Disclosure, Sep. 1986, No. 269, Kenneth Mason Publication Ltd., England.

Primary Examiner—A. D. Pellinen
Assistant Examiner—Jeffrey A. Gaffin
Attorney, Agent, or Firm—William A. Drucker

[57] ABSTRACT

A removable modular control device for a contactor apparatus having in a casing, power switches actuated by an electromagnet, the coil of which is connected to two external connecting terminals accessible from the exterior through two respective openings provided on the upper face of the casing, each of these terminals having one clamping screw accessible through one opening formed in the front face of the casing. The control device includes a selector which is lodged in an insulating case provided with two rigid projecting pins adapted to be clamped in the connecting terminals, this selector being connected between the projecting pins and input terminals disposed on the upper face of the insulating case.

12 Claims, 4 Drawing Sheets

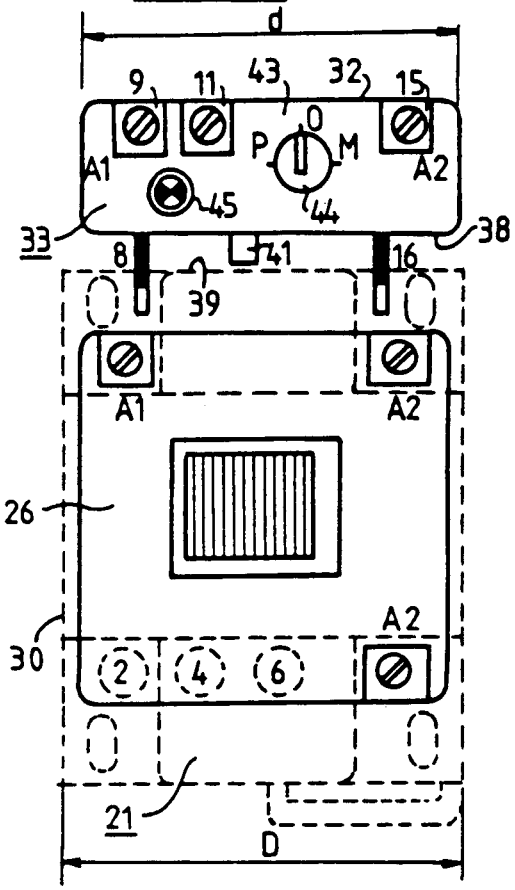
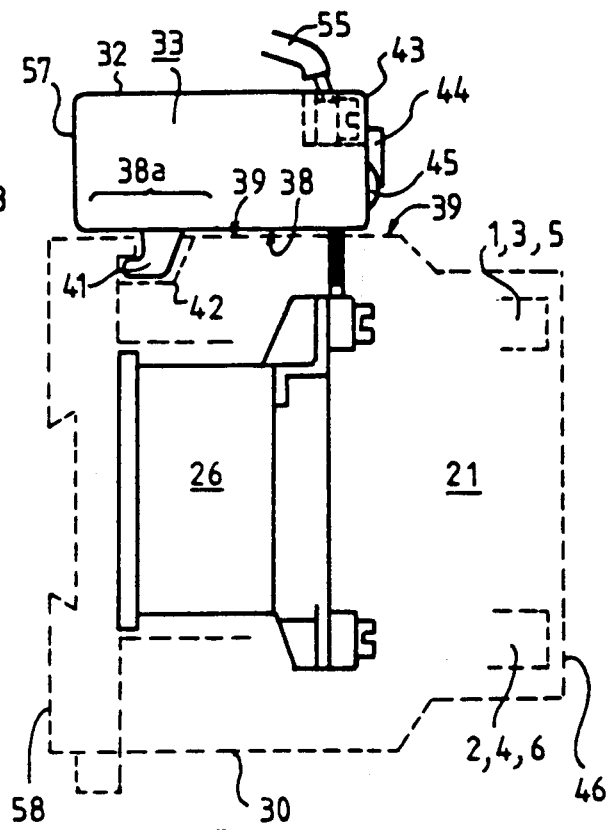
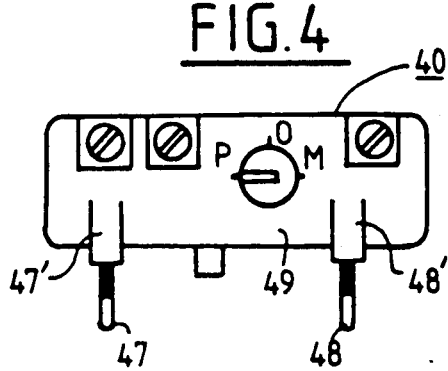
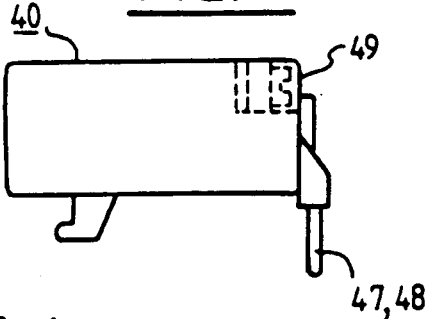
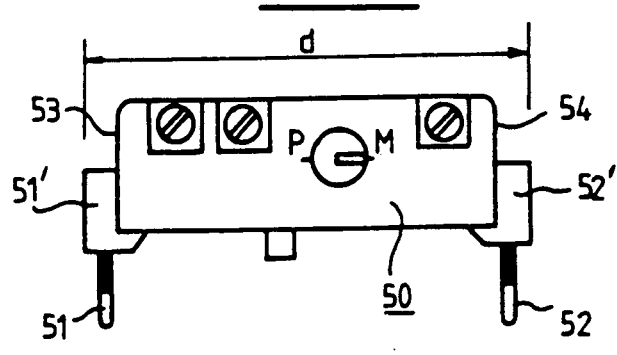

REMOVABLE MODULAR CONTROL DEVICE FOR A CONTACTOR APPARATUS

BACKGROUND OF THE INVENTION

The invention relates to a removable modular control device for a contactor apparatus comprising power switches which are actuated by an electromagnet having an energization coil which comprises a first end permanently connected to a pole of a power supply source and a source end connected to a selector circuit capable of transmitting control signals of opposite polarity to that of the source. These control signals are provided either by an automatic device, or transmitted by a means independent of the preceding one.

Control systems known in the prior art generally require a cabinet or a board in which is usually disposed a function selector which able to orient either the signals emitted by the circuit of an automatism or the signals which must be applied independently of the preceding ones towards one of the ends of the coil, for checking for example the correct operation of a particular contactor by a manual forced operation and interruption order.

In one embodiment which is widely used, the selector is disposed not on the panel of a cabinet but on the front face of the cover of a small box containing the contactor with which it is connected by conductors going from the cover to terminals connected to the coil of the contactor, the latter being fixed on a face of this box.

In both cases, the member for controlling the selector, which is disposed accessibly, may be incorrectly manipulated or inadvertently moved, whereas its presence is only justified by the infrequent need to carry out an operating check.

Furthermore, it can be seen that in each of these cases it is necessary to use more or less long conductors which are themselves likely to be the cause of breakdowns or troubles.

SUMMARY OF THE INVENTION

The invention consequently provides a selector module capable of being directly associated with a contactor apparatus with which it cooperates, so as to make its operation more reliable and reduce the size of the cabinets, boards or boxes, which was necessary in the prior art.

According to the invention, this selector circuit, carrying out electric orientation and interruption functions, is: disposed in an insulating case of an operation selector module which is removable through two rigid electric output pins, adapted to be engaged in two upper connection terminals connected to the coil so as to provide mechanical holding thereof by clamping, and connected between these terminals and input terminals disposed on front face of the module, close to the front face of the contactor, the width of this module being close to the width of this contactor, measured parallel to the power terminals of the latter.

BRIEF DESCRIPTION OF THE DRAWINGS

The invention, as well as different embodiments to which it may apply, will be better understood from the following description and the accompanying figures which illustrate :

FIGS. 2 and 3, an elevational view and a side view of a first embodiment;

FIGS. 4 and 5, an elevational view and a side view of a second embodiment of the case of the module; FIG. 6, an elevational view of a third embodiment of the case of the module.

DESCRIPTION OF THE PREFERRED EMBODIMENTS

Figure 1:
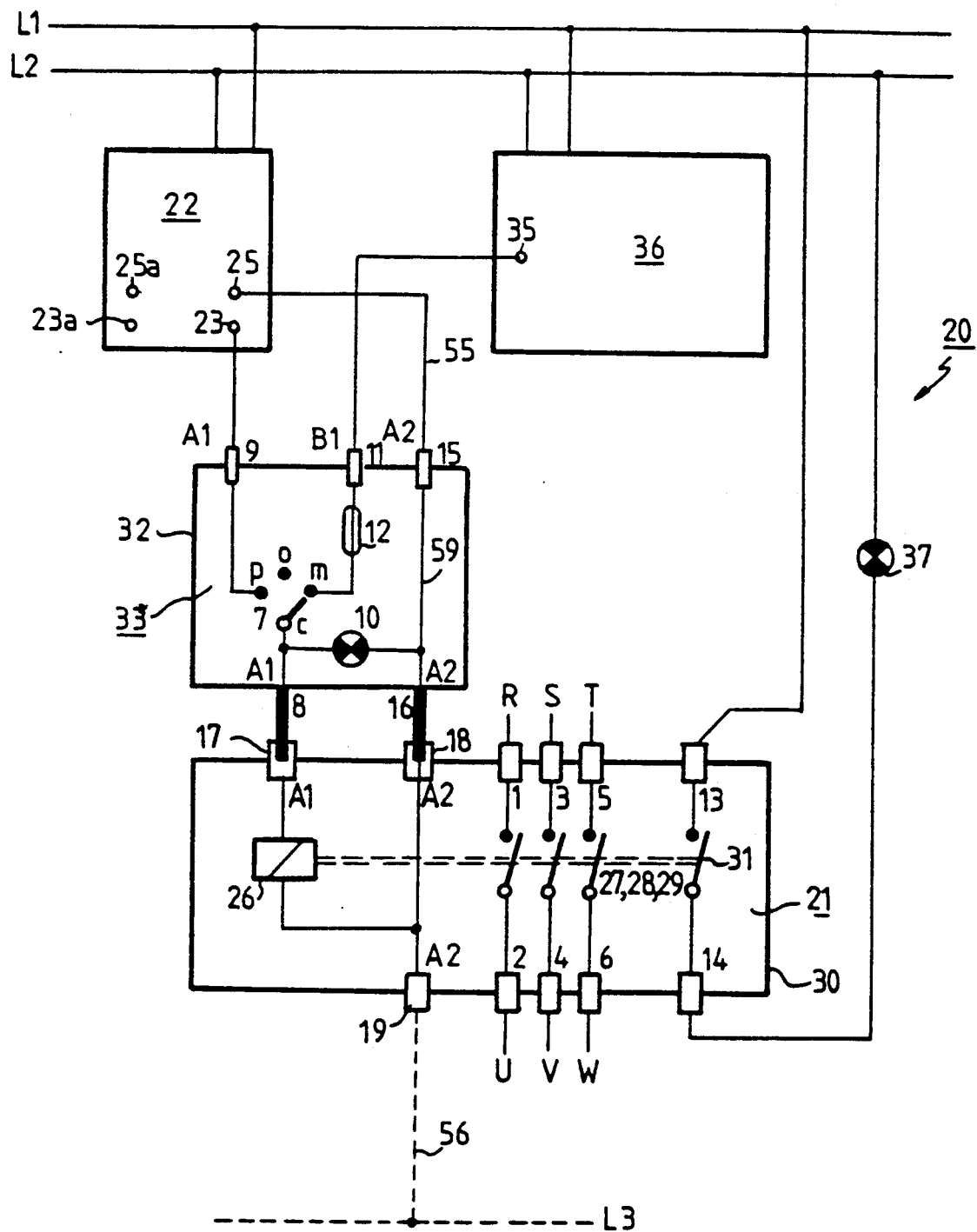
FIG. 1, an electric connection diagram of a contactor apparatus with which is associated a selector module according to the invention.

The wiring diagram of a control system 20 for an electromagnetic contactor which is shown in FIG. 1 comprises, for example, two power supply lines $L_1$, $L_2$ which serve as source for a programmable automatic device 22; the latter has a multiplicity of pairs of output terminals such as 23, 25; 23a, 25a which are each intended to supply a coil 26 of a contactor, such as 21.

Contactor 21 comprises, for example, three pairs of input and output terminals 1,2; 3,4; 5,6 of power switches 27,28,29 which are supplied by an RST network and are actuated by the coil; an auxiliary signalling or latching switch such as 31, having terminals 13,14, is frequently disposed in the same case 30 of the contactor.

The ends of the conductor of the coil are connected to two input and output terminals 17, 18, a third terminal 19 connected to the preceding one being generally disposed like the other two on a cheek of the coil carcase, but on an opposite side, see also FIG. 2. The indexed letters $A_1$, $A_2$, $A_2$ shown correspond to those which are usually employed on apparatus for identifying the function of the coil terminals.

Between contactor 21 and the programmable automatic device 22 is disposed,.in an insulating case 32 for a selector module 33, a three position change-over switch 7 whose mobile contact —c— which is connected to a terminal of a first type or output terminal 8, may come into contact with two fixed contact studs —p— respectively —m—, which are respectively connected to two terminals of a second type or input terminals 9 respectively 11.

In a particular position 0 of the mobile contact, the latter is connected to no terminal.

A third input terminal 15 of the second type is further connected to a pin or second output terminal 16 of the first type by a conductor 59, whereas a light indicator, such as a LED, a neon lamp or an incandescent lamp 10 is connected between terminals 8 and 16. Accessorily, a fuse 12 may be inserted between terminal 11 and stud —m—.

Finally, the input terminal 11 of the selector module 33, having the function referenced $B_1$, is connected to a terminal 35 of a power supply source 36 which is able to present a potential identical to that which appears at terminal 23 of the automatic device and which is advantageously distinct from that of the latter.

In the non limitative example of circuit 20, the auxiliary switch 31 supplies a monitoring indicator 37 which shows the state of the mobile pieces of the contactor.

As can be seen in FIGS. 2 and 3, case 32 of the selector module 33 has a prismatic shape with a lower face 38 carrying two projecting pins 8, 16 which form the terminals of the same reference and are adapted to be engaged in upper terminals 17, 18 of coil 26 during an association placing this face 38 against a parallel upper face 39 of case 30 of contactor 21.

This case may be fastened, either solely by nipping the rigid pins 8, 16 which is provided by the screws of the upper terminals 17, 18 of the carcase of the coil, or else with the provision of complementary fastening obtained by the penetration of a hook 41 of the case in a recess with shoulder 42 formed on the upper face 39, see FIG. 3; this fastening device is advantageously placed in a region 38a of face 38 distant from pins 8, 16.

A front face 43 of case 32 has terminals 9, 11, 15 so as to facilitate screwing up of the corresponding screws from the front, as well as an orientable knob 44, preferably flush, which is coupled to the mobile contact of the change-over switch 7 and which can only be operated by means of a tool such as a screwdriver. Conductors such as 55 are introduced into terminals 9, 11, 15 through the upper face of the module.

A window 45, also placed on this front face, makes it possible to observe the light emitted by lamp 10.

The assembly of terminals 9, 11, 15 of the selector module and terminals 1,2; 3,4; 5,6; 13,14 of the contactor is therefore accessible on the parallel front faces 43 respectively 46.

In a variant shown in FIGS. 4 and 5, the connection pins 47,48 adapted for cooperation with the coil terminals project from the front face 49 of a second type of case 40, where excrescences 47', 48' of this case serve for holding them in position.

Another variant shown in FIG. 6 could comprise pins 51, 52 projecting from two opposite lateral faces 53, 54 of a case 50, on which are placed excrescences 51', 52' serving for holding them in position.

In all the possible embodiments (see FIGS. 2 to 6) pins 8,16 ; 47,48 ; 51,52 may be protected over a part of their length by molding or by an insulating sheath shown in black, and the width —d— of the case is substantially close to the width —D— of the associated contactor, measured along the associated faces such as 38 and 39 or parallel to the rows of terminals 1, 3, 5, whereas the rear face 57 of the module does not extend beyond the rear face 58 of the contactor, see FIG. 3, so as not to come into contact with a wall on which the contactor is fixed.

In the diagram shown in FIG. 1, it can be seen that terminal 11 is connected to an auxiliary power supply source 36; this latter could, without changing the objects of the present invention, be taken from a second source of another origin which may belong, as the case may be, to the automatic device 22, if the latter is equipped accordingly.

Finally, instead of conductor 55 connecting terminal 15 and module 33 to terminal 25 of the automatic device and serving for the current return, a conductor 56 may be provided connected between the lower terminal $A_2$ of the contactor and a line $L_3$ having an appropriate potential.

Figure 7:
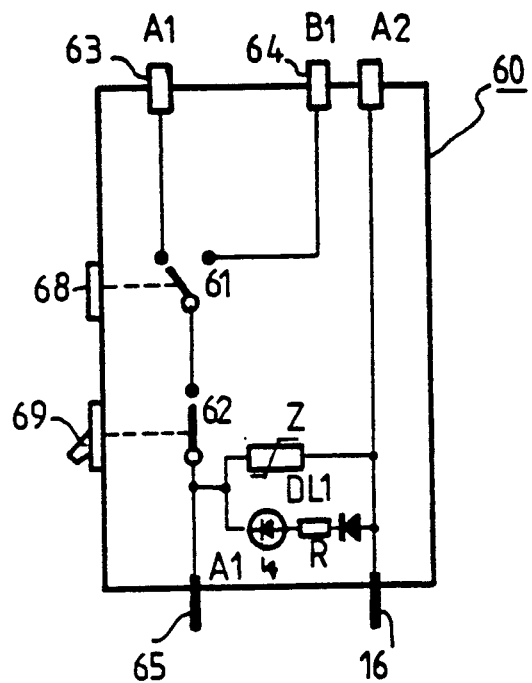
FIG. 7, a second embodiment of the internal circuit of the selector module and switch.

If it is desired to avoid possible confusion relating to the choice of the operating or stopping method which the user desires, the function of knob 44 and that of switch 7 which is associated therewith may, in a variant, be dissociated by using, in a module 60, a circuit shown in FIG. 7.

In this variant, an change-over switch 61 and a switch 62 are placed in series between the upper function current inputs $A_1$, $B_1$ having terminals 63, 64 and the lower function current output $A_1$ having a pin 65.

Figure 8:
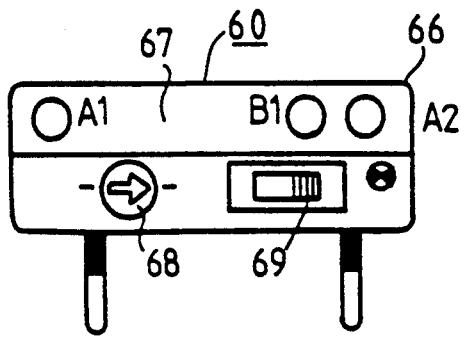
FIG. 8, a front view of the selector module and of the switch corresponding to the circuit of FIG. 7.

The case 66 of module 60 then has on its front face 67 two operating knobs 68 and 69 which are coupled to the mobile contacts of the change-over switch and switch 61 respectively 62, see FIG. 8.

Figure 9:
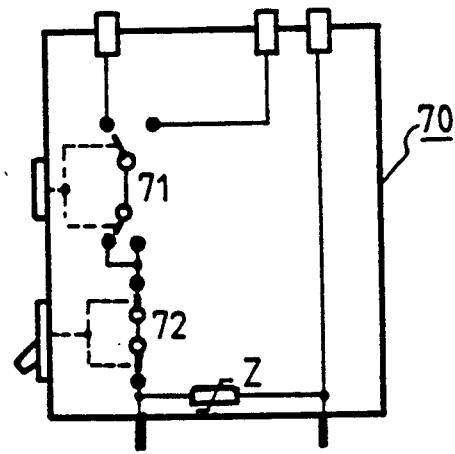
FIG. 9, one embodiment of a circuit comparable to that of FIG. 7, better adapted to DC control signals.

When a module 70 is more particularly intended to be placed in series with a contactor whose electromagnet is fed with DC current, better performances will be obtained if double cut-off change-over switches 71 or switch 72 are used, as can be seen in FIG. 9.

Figure 10:
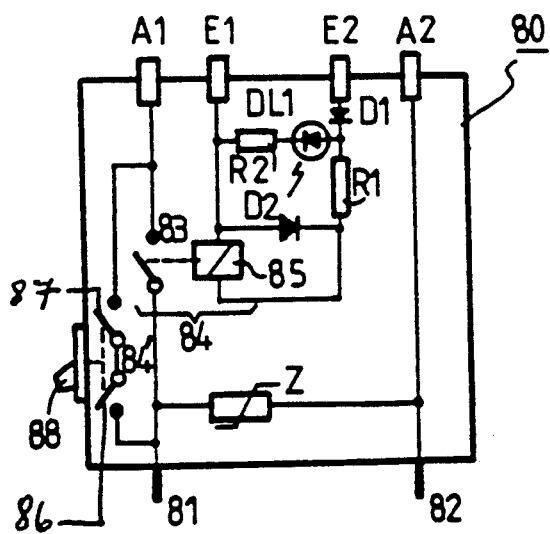
FIG. 10, a third embodiment of a module circuit having galvanic insulation between the control signals and the power supply source.

When the functions provided by the selector module and switch 80 require electric decoupling between coil and the control signals, a circuit may be used such as that shown in FIG. 10 where, as in the preceding examples, the input terminal $A_2$ is connected directly to the output terminal 82, whereas the input terminal $A_1$ is connected to the output terminal 81 through two switches 83 and 84 connected in parallel.

The first switch 83 is here actuated by a low consumption relay 84 with which are associated, for example, components for protection against the reversal of polarity (diode $D_1$) and for signalling (LED $DL_1$); the coil 85 of this relay is connected to input terminals $E_1$, $E_2$ which are, like $A_1$, $A_2$, placed on the front face of the module 80 and are advantageously connected to an external programmable automatic device : this circuit portion is therefore isolated.

The second switch is again shown by a double cut-off switch 84' having two sections 86, 87 mounted in series and having a common manual control member 88 accessible from the same front face, by means of which forced operation and interruption of such operation may be provided, independently of the signals present at $E_1$, $E_2$; a limiter component $Z_1$ is here placed between terminal 82 and terminal $A_1$.

Figure 11:
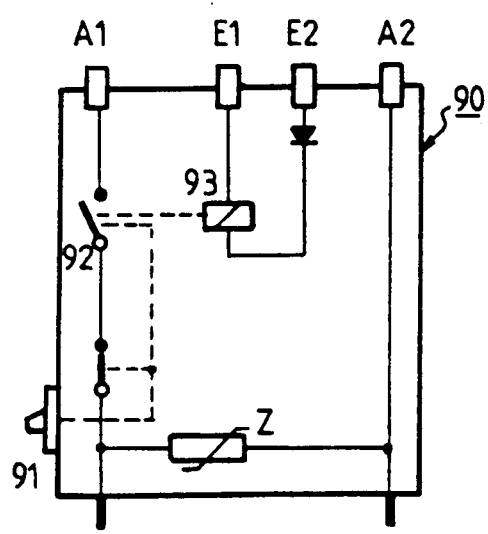
FIG. 11, another embodiment of a module circuit having galvanic insulation.
Figure 12:
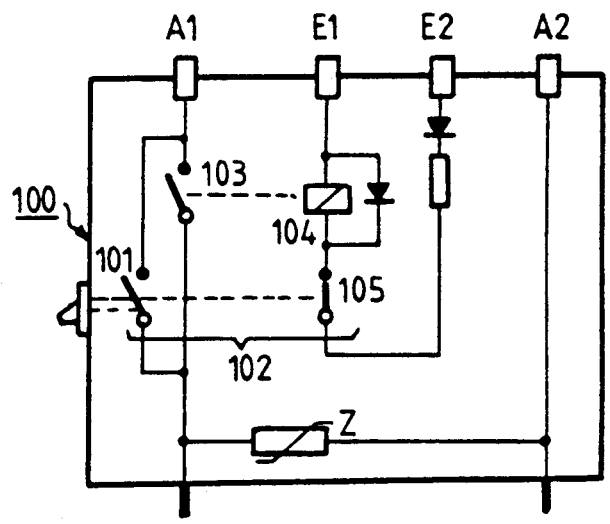
FIG. 12, a variant of the circuit of FIG. 10.

Should it prove necessary, because of the working mode of the automatic device, the same manual control member 91 of a module 90, see FIG. 11, may at the same time provide forced opening of switch 92 of a relay 93 and of the manual switch 94, see FIG. 11. In a variant of FIG. 10, shown in FIG. 12, a module 100 has a first section 101 of a double section manual switch 102 which may be connected in parallel across the switch 103 of the relay 104 and a second section 105 which may be placed in series with the isolated circuit of the coil of the relay 104 for inhibiting possible energization by signals applied to terminals $E_1$, $E_2$.

The different embodiments will advantageously each comprise a voltage limiter component, such as a variable resistor Z comprising, for example, zinc oxide, which will be connected in parallel across the output terminals. As a complement, a RC circuit serving as antiparasite may also be connected between these terminals or be disposed externally of the module in direct relation with the terminals of the coil.

What is claimed is:

1. A removable modular control device for a contactor apparatus comprising a housing having a upper wall and a front wall, and, in the said housing, power switching means actuated by an electromagnet having a first coil the two ends of which are respectively connected to two respective control terminals adapted to receive external electric conductors passing through a first pair of openings formed in the upper wall and to clamp said conductors by clamping screws accessible through a second pair of openings formed in the front wall, said removable modular control device comprising a selector lodged in an insulating case having an upper face, a front face and a lower face which is provided with first and second rigid projecting pins located so as to be engaged and clamped in the connecting terminals of the contactor thus providing both electrical and mechanical connection thereto, the first projecting pin being connected to a first input terminal which is permanently connected to a pole of a power supply source and the selector being connected between the second projecting pin and a second and third input terminals on which are applied transmitting signals which are provided by two distinct control means and which present a polarity opposite that of the said source, said input terminals each having an input orifice formed in the upper face of the case and a clamping screw accessible through an opening formed in the front face of the case.

2. A control device as claimed in claim 1, wherein the said case is disposed on the upper wall of the contactor apparatus with which it is associated by a hook and recess system placed in a region of the upper wall and of the lower face of the modular control device distant from the terminals.

3. A control device as claimed in claim 1, wherein the selector comprises an electric change-over switch with three positions, one of which provides an electrical insulation between said second projecting pin and said second and third input terminals.

4. A control device as claimed in claim 3, wherein at least one operating member, connected to said change-over switch is accessible from the front face of the said case.

5. A control device as claimed in claim 1, wherein the selector comprises an electric change-over switch with two positions, whose mobile contact is connected to a switch placed in series with said second pin.

6. A control device as claimed in claim 5, wherein said change-over switch and said switch are of the double-break type.

7. A control device as claimed in claim 1, wherein said selector comprises a first electric switch and a second switch placed in parallel on the first switch, said second switch being controlled by a small relay having connection terminals placed on the front face of the said case.

8. A control device as claimed in claim 7, wherein said first switch is of the double-break type.

9. A control device as claimed in claim 1, wherein the first input terminal is directly connected to the first pin by a conductor.

10. A control device as claimed in claim 1, wherein an electric or electronic light means, visible on the front face of the case, indicates the presence or absence of a voltage between the said first projecting pin and the said second projecting pin.

11. A control device as claimed in claim 1, wherein a voltage limiting component is connected between the said first projecting pin and the said second projecting pin.

12. The control device as claimed in claim 1, wherein said selector uses a first electric switch and a second switch is placed in parallel on said first switch, said second switch being controlled by a small relay comprising a first coil and connected by a circuit to two connection terminals disposed on the front face of the said case, and a third switch connected in series with the said second coil in the said circuit, said third switch being actuated in synchronism with the first electric switch by means of a common actuating member.

* * * * *